(12) United States Patent
Eren et al.

(10) Patent No.: US 9,935,562 B2
(45) Date of Patent: Apr. 3, 2018

(54) HIGH EFFICIENCY INVERTER FOR DISTRIBUTED GENERATION

(71) Applicants: Suzan Eren, Kingston (CA); Majid Pahlevaninezhad, Kingston (CA); Shangzhi Pan, Kingston (CA); Praveen Jain, Kingston (CA)

(72) Inventors: Suzan Eren, Kingston (CA); Majid Pahlevaninezhad, Kingston (CA); Shangzhi Pan, Kingston (CA); Praveen Jain, Kingston (CA)

(73) Assignee: SPARQ SYSTEMS INC., Kingston, Ontario (CA)

( * ) Notice: Subject to any disclaimer, the term of this patent is extended or adjusted under 35 U.S.C. 154(b) by 3 days.

(21) Appl. No.: 14/845,037

(22) Filed: Sep. 3, 2015

(65) Prior Publication Data

US 2017/0070163 A1    Mar. 9, 2017

(51) Int. Cl.
| | |
|---|---|
| *H02M 7/5387* | (2007.01) |
| *H03H 7/01* | (2006.01) |
| *H02M 1/14* | (2006.01) |
| *H02M 1/12* | (2006.01) |
| *H02M 1/00* | (2006.01) |
| *H02M 7/48* | (2007.01) |

(52) U.S. Cl.
CPC ......... *H02M 7/5387* (2013.01); *H02M 1/126* (2013.01); *H02M 2001/0058* (2013.01); *H02M 2001/0064* (2013.01); *H02M 2007/4815* (2013.01)

(58) Field of Classification Search
CPC .. H02M 7/538; H02M 7/53871; H02M 7/003; Y02B 70/1441
See application file for complete search history.

(56) References Cited

U.S. PATENT DOCUMENTS

| | | | |
|---|---|---|---|
| 2005/0105305 A1* | 5/2005 | Sawada | H02M 1/4225 363/34 |
| 2010/0236612 A1* | 9/2010 | Khajehoddin | G05F 1/67 136/252 |
| 2013/0223103 A1* | 8/2013 | Pahlevaninezhad | H02M 3/337 363/17 |
| 2015/0092451 A1* | 4/2015 | Popovici | H02M 3/28 363/17 |

* cited by examiner

*Primary Examiner* — Nguyen Tran
*Assistant Examiner* — Monica Mata
(74) *Attorney, Agent, or Firm* — Brion Raffoul

(57) ABSTRACT

Systems, methods, and devices relating to a DC/AC inverter. The inverter has a full bridge converter and an output filter with an integrated magnetic subcircuit. The subcircuit has main and auxiliary inductors and is designed to steer the current ripple of the inverter's output to the power semiconductors in the full bridge converter. By doing so, zero voltage switching is achieved by the power semiconductors, thereby mitigating switching losses. At the same time the current ripple in the inverter's output is attenuated.

17 Claims, 20 Drawing Sheets

HIGH EFFICIENCY INVERTER FOR DISTRIBUTED GENERATION

TECHNICAL FIELD

The present invention relates to circuit and control systems of DC/AC inverters. More particularly, the present invention relates to methods, circuits, and devices for use in DC/AC inverters to implement soft-switching and to achieve high efficiency with minimised output current ripple.

BACKGROUND

Grid-connected inverters are commonly used for various applications. One of the main applications for grid-connected inverters is in distributed generation (DGs) of power. In DGs, grid-connected inverters are the interface between the utility grid and the power conditioning systems for other energy sources (e.g., solar, wind, etc.). DC/AC inverters usually operate under hard-switching where neither the voltage nor the current of the power switches is zero during the switching transitions. The power semiconductors used in DC/AC inverters are switched under very high voltage at the intermediate DC-bus (usually more than 400V). Switching losses of the power semiconductors in such inverters significantly contribute to the overall losses of the power conditioning system. In particular, reverse recovery losses of the power semiconductors' body diodes are inevitable for such topologies. Because of this, the switching frequency of the inverter is very limited, usually in the range of 10-20 kHz. Because of strict regulatory standards, high quality current needs to be injected into the utility grid from such inverters. To accomplish this, such inverters require large filters at their outputs.

Another issue with low switching frequencies is that such low frequencies create a high amount of current ripple across the inverter output inductor. This current ripple not only increases the core losses of the inductor but it also increases the inductor's high frequency copper losses. In addition to this, reducing the DC-bus voltage creates a significant amount of conduction and emission EMI noise. The high amount of conduction and EMI noise may affect the operation of the control system and may highly degrade the system's reliability.

From all of the above, it can be gathered that hard-switching limits the switching frequency of the converter and imposes a substantial compromise in the design of the output filter and in the overall performance of power conditioning systems.

To address the above issues, soft-switching may be used. There are many different soft-switching techniques reported in the literature. However, these techniques generally require many extra active/passive circuits. In particular, extra active circuits highly deteriorate the reliability of the system due to the additional complexity imposed by the active components. Also, the effectiveness of these techniques is questionable. Some studies have shown that some soft-switching techniques may add more losses to the converter and, consequently, greatly offset their advantages. Because of this, most industrial products use the more conventional hard-switching inverters with large filters in order to ensure a reliable power conditioning system. Even though the system's performance is highly compromised with hard-switching and bulky lossy filters, industrial decision makers prefer to use a reliable, well-known solution for the inverter.

Auxiliary circuits have previously been used to provide soft-switching conditions for the power semiconductors for voltage source inverters. Such soft-switching circuits usually use a combination of active and passive circuits in order to provide soft-switching conditions. However, generally, active circuits increase the complexity of the power circuit and reduce the reliability of the systems. In addition to this issue, losses related to auxiliary circuits usually highly offset the advantages of the soft-switching and thereby compromise the converter performance. As well, it is usual that auxiliary circuits include a resonant circuit with a very high amount of peak current/voltage. There are, therefore, significant amounts of losses attributed to auxiliary circuits. As well, it should be clear that passive components should be able to withstand the high amounts of currents and voltages during switching transitions. FIG. 1 shows an exemplary arrangement for such auxiliary circuits (prior art).

In DC/AC inverters with hard switching and low switching frequency, the current ripple across the output inductor creates a significant amount of power losses. The impact of this current ripple on the power losses is two-fold. First, the current ripple produces core losses and, second, the current ripple also increases the high frequency ohmic losses of the converter. Usually, magnetic wires are used to wind the output inductors and these magnetic wires show a significant resistance to the high frequency currents. In conventional designs, the current ripple is usually kept very small so that only a negligible high frequency current ripple is produced. As well, in conventional designs, the current ripple is usually kept very small so that only a small amount of the attributed high frequency ohmic losses are produced. Unfortunately, another restriction is that, in high power density designs, even though the magnetic wires resist the high frequency currents, the inductors cannot be very bulky.

In order to reduce the current ripple injected to the grid and to thereby improve the quality of the grid current, an LCL-filter is usually used at the output of the inverter. LCL-filters provide higher attenuation for high frequency harmonics compared to conventional L-filters. FIG. 2 shows an exemplary arrangement for the DC/AC inverter with LCL-filters (Prior Art).

While LCL-filters can be useful, there are some difficulties created by LCL-filters in DC/AC inverters. The first problem is that LCL-filters provide a path for the grid even when the inverter is off. In particular, in grid-connected inverters, there is a constant current drained from the grid. Also, the LCL-filter can resonate with other components (e.g., RLC loads) connected at the Point of Common Coupling (PCC) through this current path in micro-grid applications. Since the inverter has no control of this resonance, the resonance current can be substantial and can harm different components connected to the point of common coupling. It should be noted that this resonance is the one between the external components and the current path including L2 and C inside the inverter, not the resonance created by the LCL-filter which can be damped by the control system.

FIG. 3 shows an exemplary arrangement of a system with an LCL-filter and which illustrates the current paths provided by the LCL-filters. Another difficulty with the LCL-filter is the physical space it occupies in the circuit as it requires two inductors. This difficulty is especially relevant in low profile applications where LCL-filters can take up a significant real estate of the board as they require two separate inductors. It should be noted that, even though LCL-filters require two smaller inductors when compared to conventional L-filters, LCL-filters usually take up more space since they require two separate magnetic cores.

What is needed is a simple and practical solution which provides soft-switching for the power semiconductors and which, simultaneously, does not compromise system reliability. Also, the high frequency current component of the output inductor is preferably limited in order to provide a high power density converter with superior efficiency. It is therefore preferable to only use passive components for soft-switching the power semiconductors and to also reduce the high frequency component of the inverter output current. Also, another preference is to optimize (or minimize) any losses associated with the extra passive components. Such preferred optimized losses due to the extra components should not offset the advantages of soft-switching.

SUMMARY

The present invention provides systems, methods, and devices relating to a DC/AC inverter. The inverter has a full bridge converter and an output filter with an integrated magnetic subcircuit. The subcircuit has main and auxiliary inductors and is designed to steer the current ripple of the inverter's output to the power semiconductors in the full bridge converter. By doing so, zero voltage switching is achieved by the power semiconductors, thereby mitigating switching losses. At the same time the current ripple in the inverter's output is attenuated.

In a first aspect, the present invention provides a DC/AC inverter comprising:
a DC-bus capacitor;
a full bridge converter having a first and a second leg coupled in parallel, each leg comprising at least two power semiconductors, said capacitor being coupled in parallel to said converter;
an output filter having an integrated magnetic subcircuit for steering a current ripple at an output of said inverter to said power semiconductors in said converter, said output filter being coupled to said converter and to a load;
wherein
said filter attenuates said current ripple at said output when said current ripple is steered to said converter.

In a second aspect, the present invention provides an output filter comprising:
a first main inductor;
a second main inductor;
a first auxiliary inductor;
a second auxiliary inductor;
an auxiliary capacitor;
wherein
said first main inductor is coupled between a first input connection point and a positive lead of a load;
said second main inductor is coupled between a second input connection point and a negative lead of a load;
said first auxiliary inductor is coupled between said auxiliary capacitor and said first input connection point;
said second auxiliary inductor is coupled between said auxiliary capacitor and said second input connection point;
said first main inductor and said first auxiliary inductor has a mutual inductance;
said second main inductor and said second auxiliary inductor has a mutual inductance.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
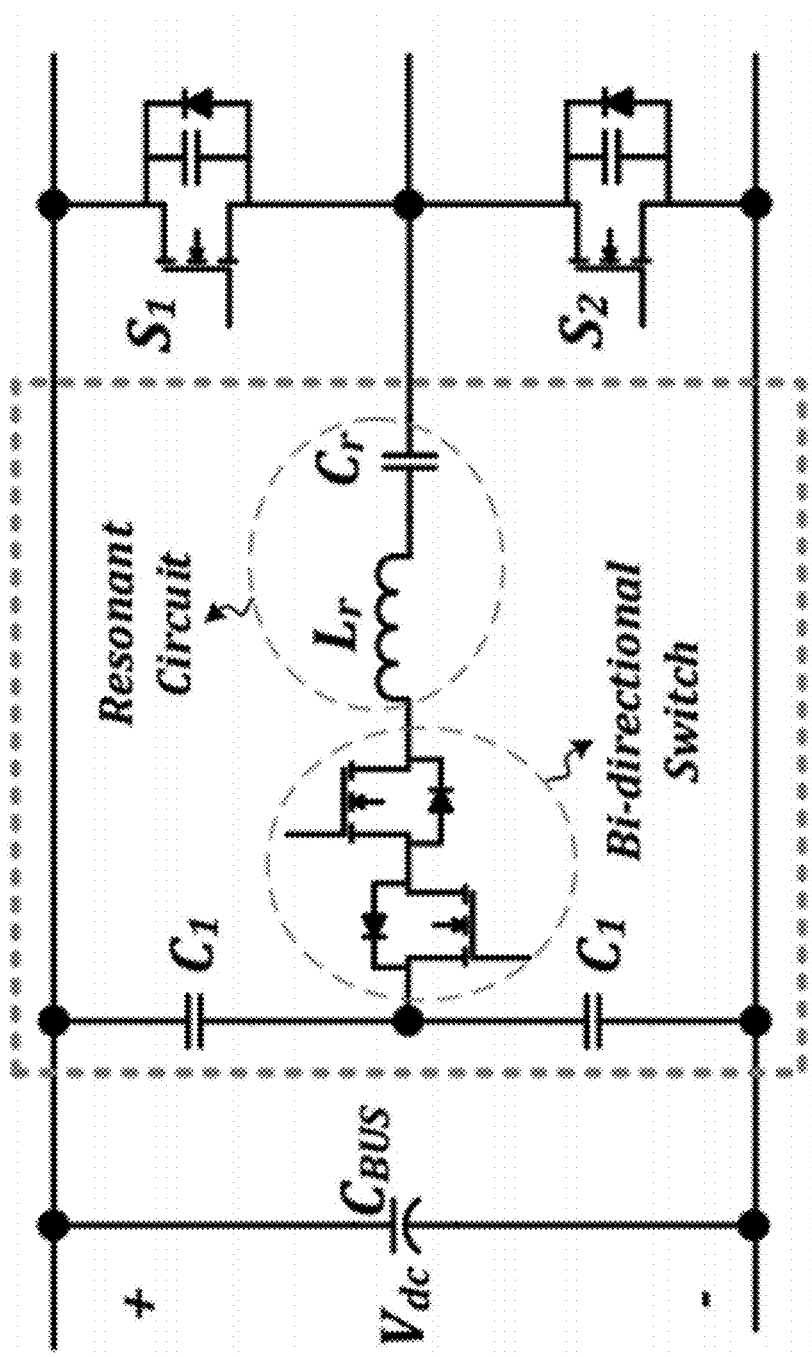
FIG. 1 is a circuit diagram of an auxiliary circuit according to the prior art.
Figure 2:
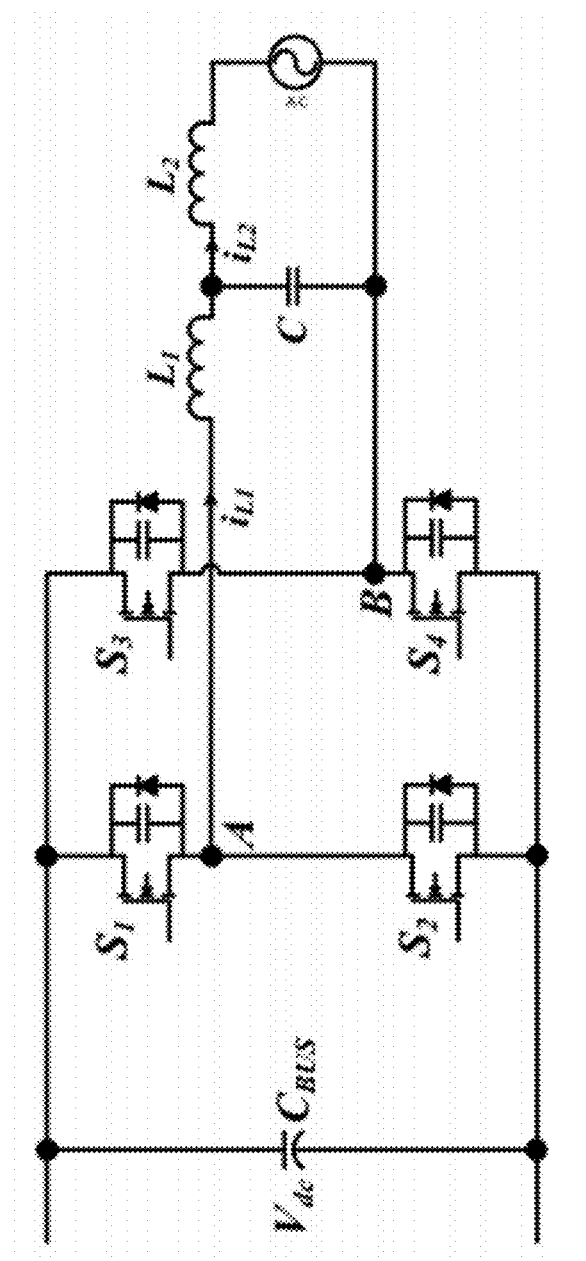
FIG. 2 is a diagram of a DC/AC inverter with an LCL-filter according to the prior art.
Figure 3:
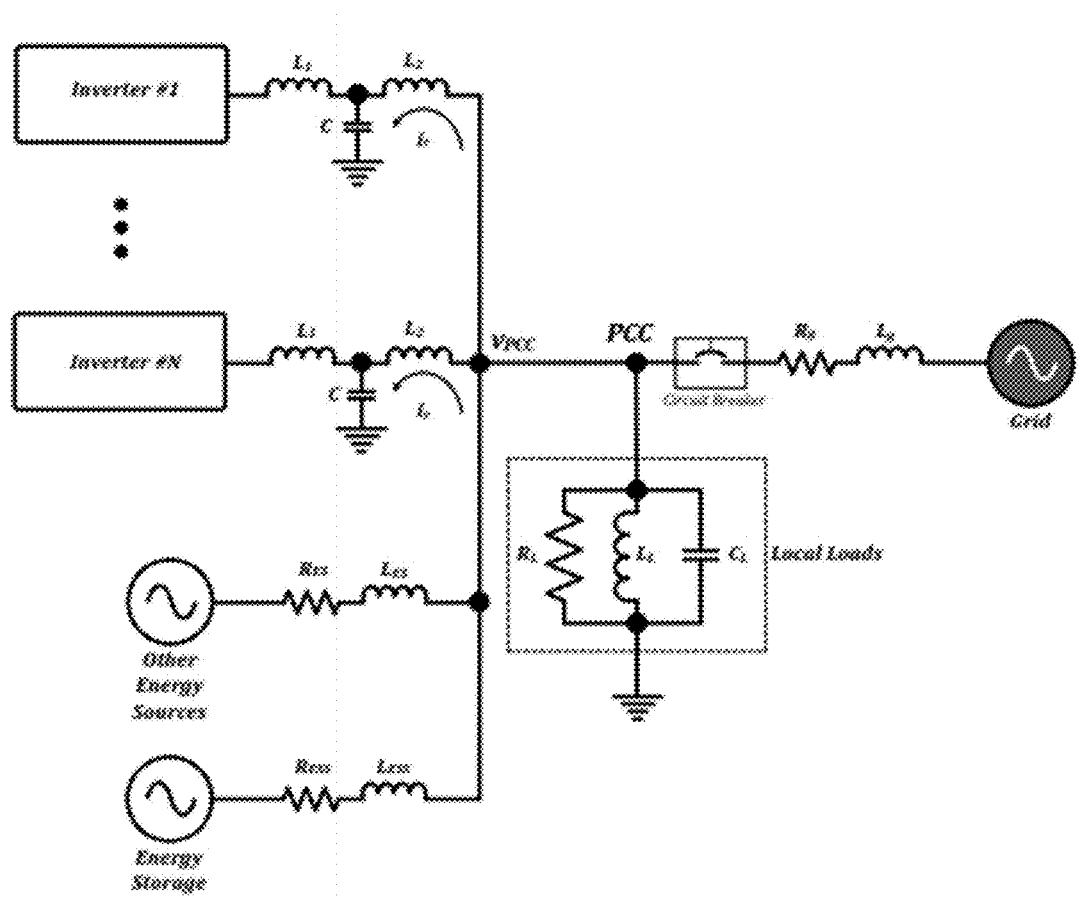
FIG. 3 illustrates the current path created by the LCL-filters according to the prior art.

The present invention relates to DC/AC inverters and, in particular, to voltage source inverters. The invention may be implemented in power conditioning systems used in different applications such as grid-connected inverters used in distributed power generation systems.

In order to overcome the shortcomings associated with the hard-switched DC/AC (Direct Current/Alternative Current) inverter and the high amount of current ripple across the output inductor, presented as one aspect of the invention is a ripple steering circuit for the DC/AC inverter with soft-switching and with a significantly attenuated output current ripple.

In one aspect, the present invention has a full-bridge inverter, an output filter with an integrated magnetic subcircuit, and a control system. The control system is responsible for injecting a high quality current to the utility grid as well as for optimally controlling the current through the integrated magnetic subcircuit. The integrated magnetic subcircuit steers the current ripple to the power semiconductors of the full-bridge inverter in order to provide the soft-switching condition. The steered current ripple charges the output capacitors of one power semiconductor and discharges the output capacitor of the other semiconductor in one leg of the full-bridge inverter during switching transitions. This way, the semiconductors are switched on at zero voltage. This eliminates the switching losses of the power semiconductors at turn-on and also removes the reverse recovery losses of the body diodes of the power semiconductors.

The control approach used in the present invention simultaneously controls the output current of the DC/AC inverter and the current through the integrated magnetic subcircuit. The control approach adjusts the duty ratio of the gate pulses applied to the power semiconductors in order to control the output current of the DC/AC inverter. The control approach also adjusts the switching frequency of the gate pulses of the power semiconductors in order to control the current through the integrated magnetic subcircuit. The switching frequency is controlled in a specific way to optimize the amount of current flowing through the integrated magnetic subcircuit. By controlling the duty ratio and adjusting the switching frequency of the gate pulses, losses associated with the integrated magnetic subcircuit are minimized.

The particular structure of the integrated magnetic subcircuit also provides significant attenuation of the output inductor current ripple. This allows for a very high quality current to be injected into the grid with minimized losses of the output inductor. The integrated magnetic subcircuit used in one aspect of the present invention eliminates the need for LCL-filters due its capability to substantially attenuate the current ripple. This aspect of the present invention therefore steers the current ripple across the output inductor to the power semiconductors to provide soft-switching. The output current ripple is thereby attenuated and the power semiconductors operate with soft-switching. Thus, the circuit of the present invention achieves two goals with one integrated magnetics subcircuit: soft-switching of the power semiconductors and current ripple attenuation at the output of the DC/AC inverter.

In one aspect, this invention provides soft-switching circuits along with control methods for a DC/AC inverter.

Switching losses is one of the main sources of power losses in a DC/AC inverter. Switching losses are due to the overlap between the voltage across the power semiconductor and the current flowing through the power semiconductor during switching transitions. Switching losses are proportionally related to the switching frequency of the converter. In order to limit switching losses to a reasonable amount, the switching frequency of the hard-switched DC/AC inverter is very limited. DC/AC inverters operating with low switching frequency require a large filter in order to attenuate the switching noise and to produce a high quality output current. In addition, a high amount of current ripple caused by low switching frequency across the filter inductor causes a high amount of core losses in the filter inductor. There are several other disadvantages to current DC/AC inverters such as high amount of EMI (electromagnetic interference), a noisy and unreliable control system, and a limited control bandwidth, imposed by hard-switching of the power semiconductors. Soft-switching techniques can effectively eliminate the disadvantages of hard-switched inverter and offer substantial improvements in the overall performance of the DC/AC inverter.

One aspect of the present invention uses a specific output filter which uses an integrated magnetic subcircuit in conjunction with specific control methods to provide soft-switching conditions, with a minimized ripple in the injected grid current. In particular, the integrated magnetic subcircuit along with the specific control methods are used in order to provide soft-switching for a DC/AC inverter and to significantly attenuate the current ripple at the output of the inverter.

Figure 4:
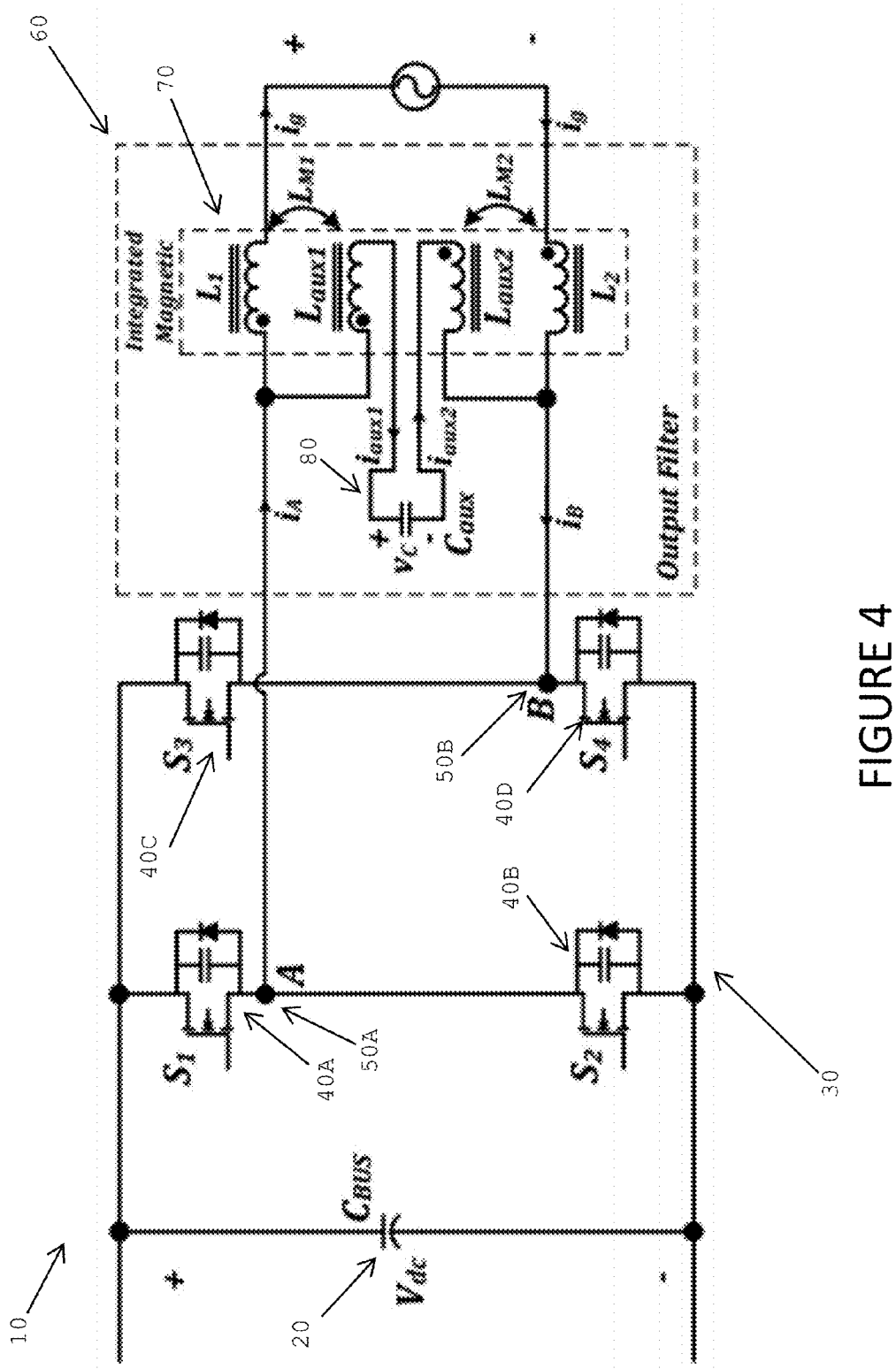
FIG. 4 is a diagram for a DC/AC inverter according to one aspect of the present invention.

Referring to FIG. 4, an exemplary arrangement of the proposed topology in the present invention is illustrated. According to FIG. 4, the DC/AC inverter includes a DC-Bus Capacitor, a full bridge inverter, an output filter with an integrated magnetic subcircuit. The inverter may be connected to the Grid. As can be seen, the full bridge inverter has two legs, each having two power semiconductors. The first leg has power semiconductor subcircuits $S_1$ and $S_2$ while the second leg has power semiconductor subcircuits $S_3$ and $S_4$. The output filter is coupled to the first leg at connection point A between the power semiconductor subcircuits $S_1$ and $S_2$ and is coupled to the second leg at connection point B between the power semiconductor subcircuits $S_3$ and $S_4$. The grid is coupled to the integrated magnetic subcircuit at two points. The DC-Bus capacitor is coupled in parallel to the full bridge inverter.

Referring to FIG. 4, a circuit diagram illustrates a circuit according to one aspect of the present invention. The circuit uses a magnetic coupling subcircuit to steer ripple from the output of the inverter to the power semiconductors in order to provide soft-switching. The integrated magnetic subcircuit in the present invention includes two main windings and two auxiliary windings. The first main winding is coupled to the connection point A of the inverter at one end and to the positive side of the grid at the other end. The second main winding is coupled to the connection point B of the inverter at one end and to the negative side of the grid at the other end. The first auxiliary winding is coupled to the connection point A of the inverter at one end and to the auxiliary capacitor, $C_{aux}$, at the other end. The second auxiliary winding is coupled to the connection point B of the inverter at one end and to the auxiliary capacitor, $C_{aux}$, at the other end.

The integrated magnetic subcircuit provides a magnetic coupling between the output filter and the connection points A and B. Through this magnetic coupling the energy of the current ripple is steered to the output capacitors of the semiconductors to provide soft-switching. Thus, the integrated magnetic subcircuit not only provides soft-switching for the power semiconductors, it also attenuates the current ripple at the output of the inverter. Other than the output filter, the circuitry in the present invention has the same structure as a conventional DC/AC inverter. Thus, it has the simplicity and reliability of the conventional DC/AC inverter with soft-switching and ripple attenuation capabilities.

In FIG. 4, the circuit 10 has an input bus capacitor coupled in parallel to a full bridge converter 30. The full bridge converter 30 has two legs, each leg having a pair of power semiconductors coupled in series with a connection point between the pair of power semiconductors. The first leg has power semiconductors 40A, 40B with a connection point 50A between the pair of power semiconductors 40A, 40B. The second leg has power semiconductors 40C, 40D with a connection point 50B between power semiconductors 40C,

40D. Each power semiconductor has an associated diode and capacitor. The full bridge converter 30 is coupled to an output filter 60. The output filter 60 includes an integrated magnetic subcircuit 70 that, in turn, is coupled to an auxiliary capacitor 80. The output of the circuit 10 is coupled to a positive and a negative leads of a grid.

As noted above, the integrated magnetic subcircuit 70 has a first main winding that is coupled between connection point 50A and the positive lead of the grid or load. A second main winding is coupled between connection point 50B and to the negative lead of the grid or load. A first auxiliary winding is coupled between connection point 50A and the auxiliary capacitor 80 while a second auxiliary winding is coupled between connection point 50B and the auxiliary capacitor 80.

Figure 5:
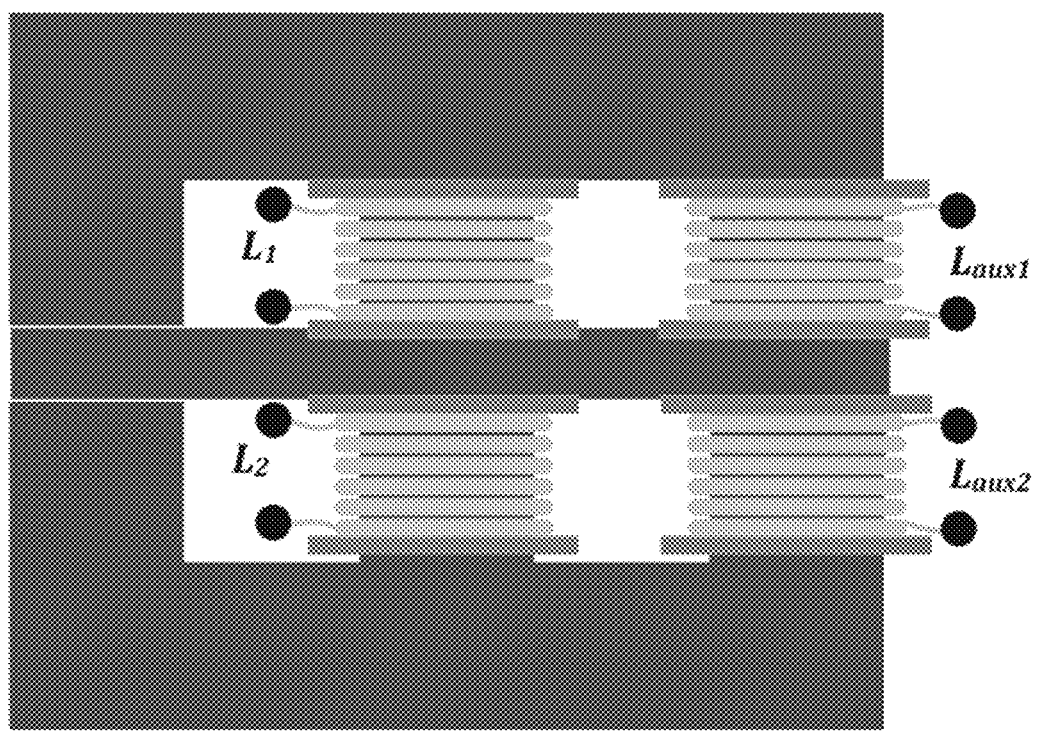
FIG. 5 illustrates one possible configuration for the main and auxiliary inductors used in the circuit in FIG. 4.

It should be noted that in the integrated magnetic subcircuit the main inductors and the auxiliary inductors can be coupled in various ways. In one embodiment, the inductors are magnetically coupled to one another by being wound on the same core in a specific manner such that this produces a certain self-inductance for each inductor as well as mutual inductance for each other. FIG. 5 shows an exemplary arrangement of the integrated magnetic.

As can be seen in FIG. 5, all the inductors are wound around a common core (i.e. the whole block in FIG. 5 is a single core). Of this common core or block, there is a branch around which the main windings or main inductors $L_1$ and $L_2$ are both wound. A second branch of this common core has the auxiliary windings or auxiliary inductors $L_{aux1}$, $L_{aux2}$ wound around it. Another possible configuration is one where the first main inductor $L_1$ and the first auxiliary inductor $L_{aux1}$ are both wound around a first common core. The second main inductor $L_2$ and the second auxiliary inductor $L_{aux2}$ are wound on a different common core (i.e. a second common core). These configurations ensure that the first main inductor is magnetically coupled to the first auxiliary inductor while the second main inductor is magnetically coupled to the second auxiliary inductor. Other configurations are, of course, possible.

The symmetric structure of the integrated magnetic subcircuit results in a very good EMI performance for the DC/AC inverter. The integrated magnetic subcircuit includes two main inductors connected to the positive line and the negative line of the grid. Thus, the EMI equivalent circuit remains the same for the positive and negative line cycles, leading to a superior EMI performance.

The coupling between the main inductors and the auxiliary inductors is able to significantly attenuate the current ripple of the inverter output current and to inject a very high quality current to the grid/load. The voltage across the main inductor $L_1$ and the voltage across the auxiliary inductor $L_{aux1}$ are respectively calculated as:

$$v_{L1} = L_1 \frac{di_g}{dt} + L_{M1} \frac{di_{aux1}}{dt} \qquad (1)$$

$$v_{Laux1} = L_{M1} \frac{di_g}{dt} + L_{aux1} \frac{di_{aux1}}{dt} \qquad (2)$$

Similarly, the voltage across the main inductor $L_2$ and the voltage across the auxiliary inductor $L_{aux2}$ are respectively calculated as:

$$v_{L2} = L_2 \frac{di_g}{dt} + L_{M2} \frac{di_{aux2}}{dt} \qquad (3)$$

$$v_{Laux2} = L_{M2} \frac{di_g}{dt} + L_{aux2} \frac{di_{aux2}}{dt} \qquad (4)$$

If the integrated magentic subcircuit is considered to be symmetric (i.e., the main inductances are equal: $L_1=L_2=L$, the auxiliary inductances are equal: $L_{aux1}=L_{aux2}=L_{aux}$) the voltages across the main inductors are equal (i.e., $v_{L1}=v_{L2}=v_L$) and the voltages across the auxiliary inductors as equal as well (i.e., $v_{Laux1}=v_{Laux2}=v_{Laux}$). Therefore, Eqs. (1)-(4) can be replaced by:

$$v_L = L \frac{di_g}{dt} + L_M \frac{di_{aux}}{dt} \qquad (5)$$

$$v_{Laux} = L_M \frac{di_g}{dt} + L_{aux} \frac{di_{aux}}{dt} \qquad (6)$$

This is because $i_{aux1}=i_{aux2}=i_{aux}$.

According to FIG. 4, the voltage across the auxiliary capacitor, $v_C$, is equal to the grid voltage, $v_g$, since $v_{L1}=v_{L2}=v_L$ and $v_{Laux1}=v_{Laux2}=v_{Laux}$. Thus, the current ripple across the main inductors are derived as:

$$\frac{di_g}{dt} = \frac{v_{dc} - v_g}{2L} \cdot \eta \qquad (7)$$

where $$\eta = \frac{1 - L_M / L_{aux}}{1 - k^2}$$

and k is the coupling coefficient $$k = \frac{L_M}{\sqrt{L \cdot L_{aux}}}.$$

In the conventional DC/AC inverter this ripple is calculated as:

$$\frac{di_g}{dt} = \frac{v_{dc} - v_g}{2L} \qquad (8)$$

Comparing Eq. (7) and Eq (8), it can be concluded that the current ripple is attenuated by the factor of $\eta$.

Figure 6:
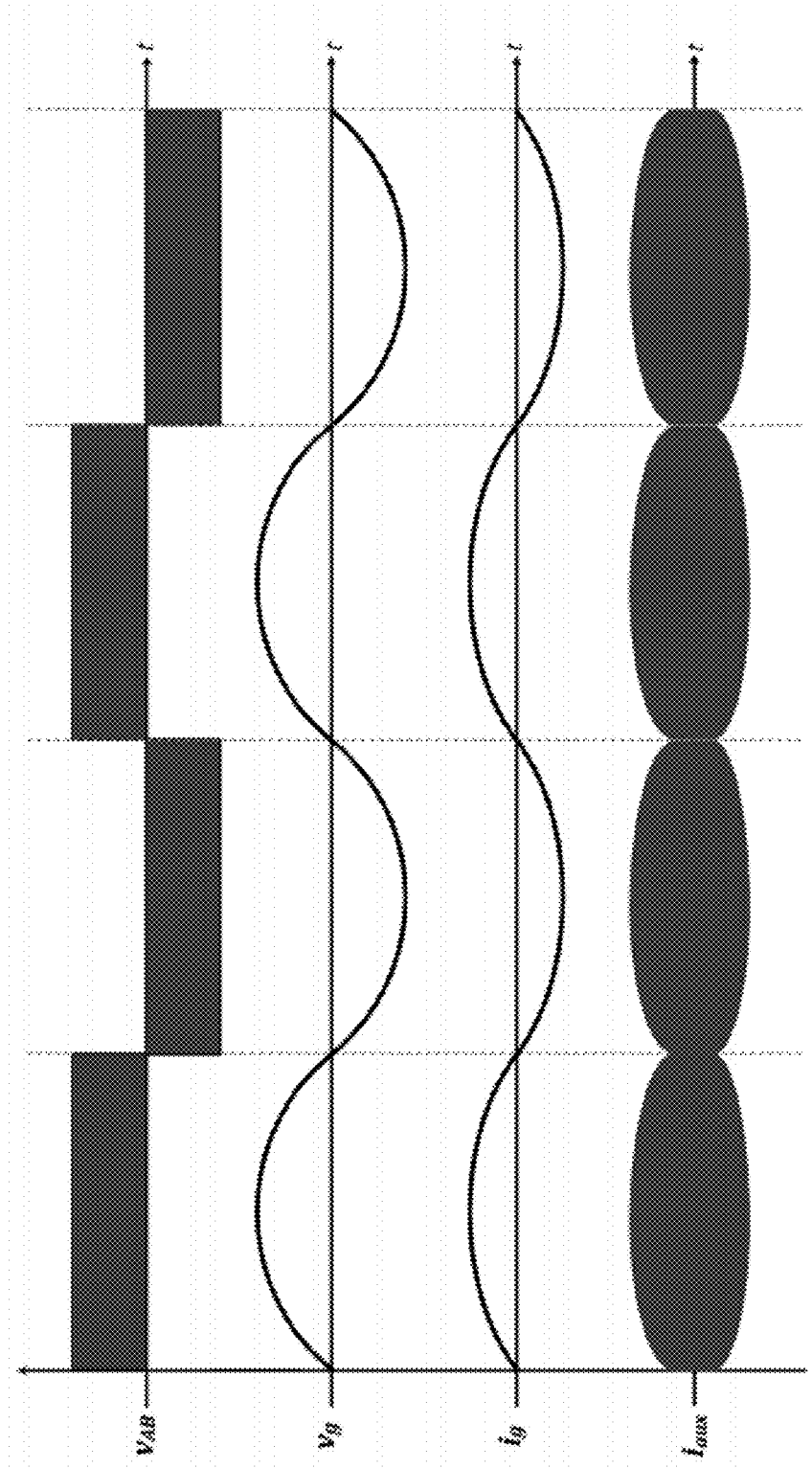
FIG. 6 depicts waveforms relating to the circuit illustrated in FIG. 4.

FIG. 6 illustrates the waveforms of the DC/AC inverter according to one aspect of the invention for two line cycles (e.g., 60 Hz cycle). According to this figure the voltage at the output of the inverter, $v_{AB}$, is unipolar (i.e., the voltage is switched either between +$V_{dc}$ and zero, or between zero and −$V_{dc}$). The grid current is nearly sinusoidal and has negligible ripple. The auxiliary inductor current is a high frequency current whose positive and negative peaks follow a specific waveform. The auxiliary inductor current provides soft-switching for the power semiconductors.

Figure 7:
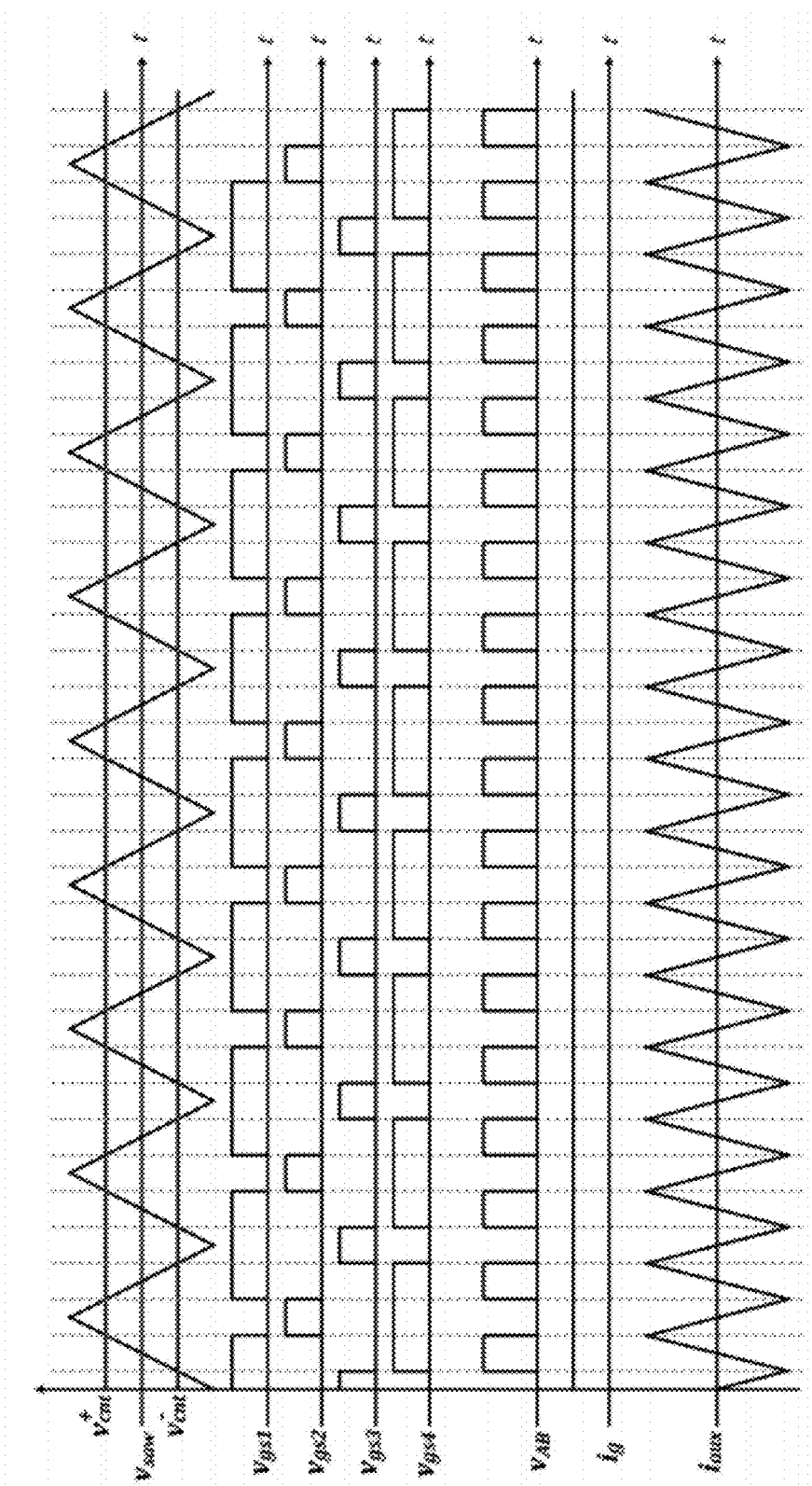
FIG. 7 illustrates waveforms for a few switching cycles for the circuit in FIG. 4 with a duty ratio of 50%.
Figure 8:
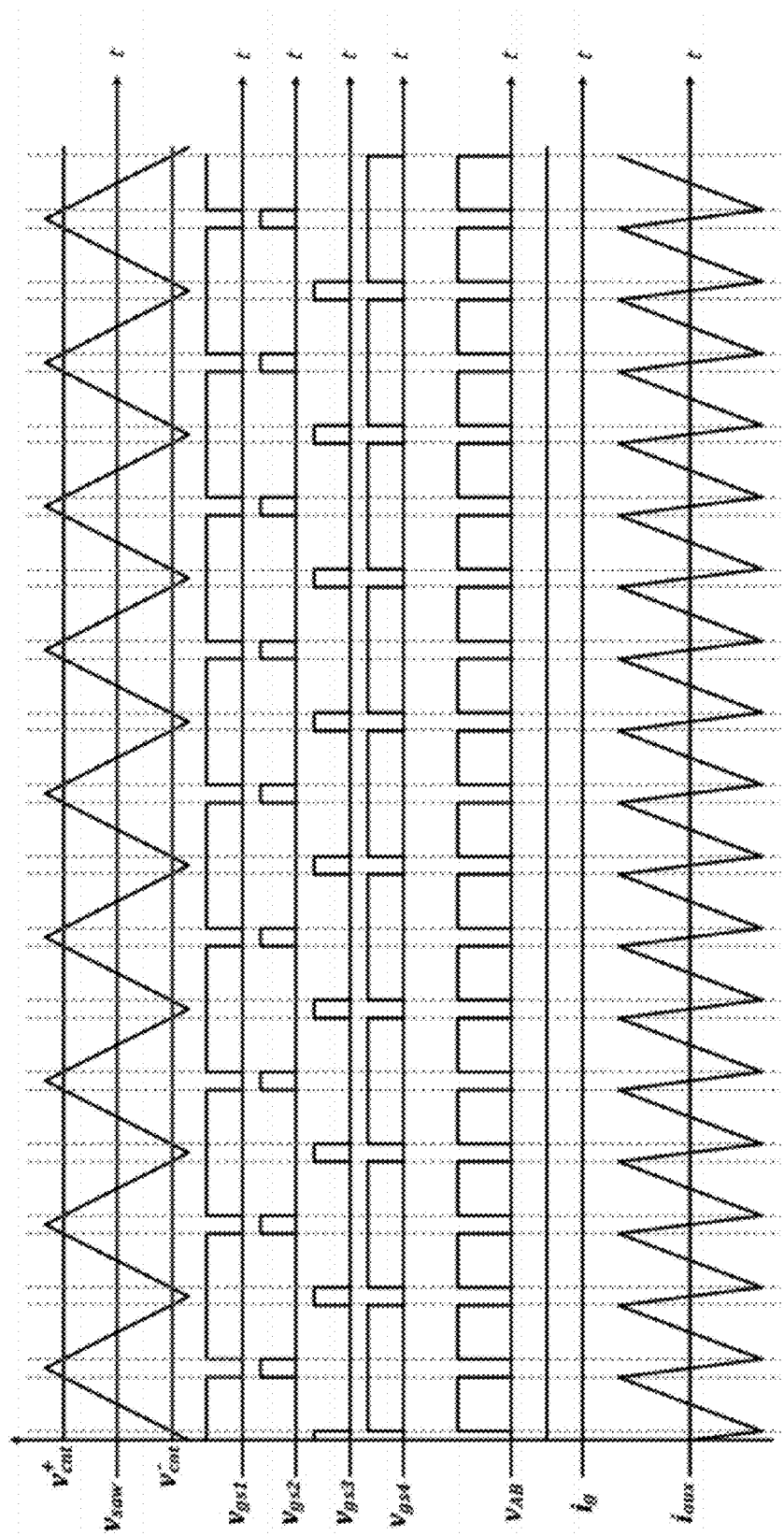
FIG. 8 illustrates waveforms for a few switching cycles for the circuit in FIG. 4 with a duty ratio of 75%.

FIG. 7 and FIG. 8 show the waveforms of the DC/AC inverter for a few switching cycles during the positive line cycle. FIG. 7 shows the waveforms for a 50% duty-cycle and FIG. 8 shows the waveforms for a 75% duty-cycle. FIG. 7 and FIG. 8 illustrate how the integrated magnetic subcircuit provide soft-switching condition through auxiliary inductance currents. The current flowing through the first auxiliary inductance, $i_{aux1}$, provides the soft-switching condition for the first leg (i.e. for semiconductors $S_1$ and $S_2$). The current flowing through the second auxiliary inductance, $i_{aux2}$, provides soft-switching condition for the second leg (i.e. for semiconductors $S_3$ and $S_4$).

Figure 9:
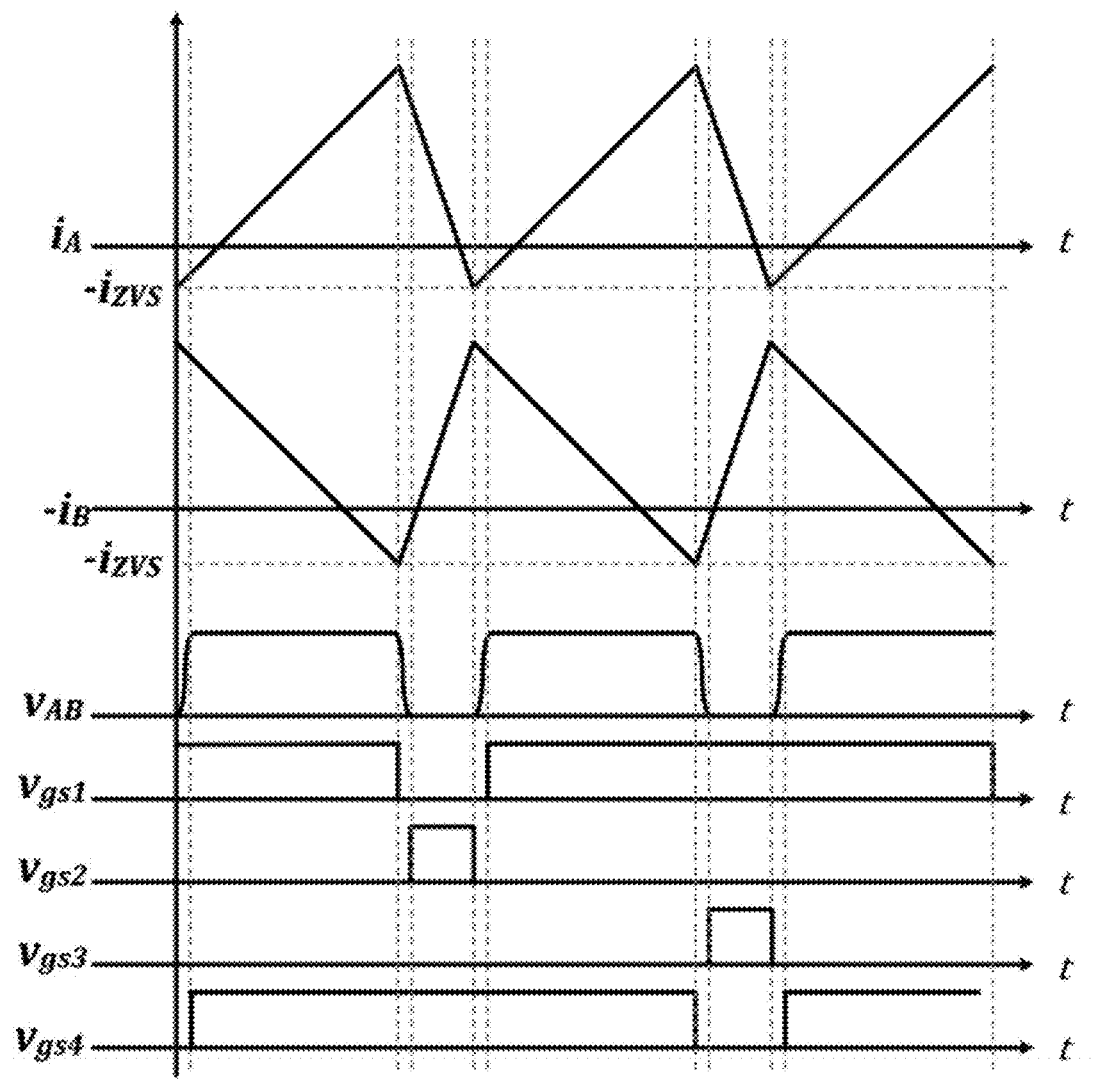
FIG. 9 shows soft-switching waveforms for the circuit in FIG. 4.

FIG. 9 shows the ZVS waveforms of the DC/AC inverter during the positive line cycle. FIG. 9 includes the current flowing out of each leg of the full bridge converter at the connection points A and B (i.e., $i_A$ and $-i_B$). According to this figure, the auxiliary circuit currents provide the negative currents prior to the turning on of the power semiconducors $S_1$ and $S_4$. Thus, the negative currents discharge the power semiconductors' output capacitance and the power semiconductors turn on under zero voltage (i.e., soft-switching). Power semiconductors $S_2$ and $S_3$ naturally have positive currents to discharge their output capacitances prior to turning on. Therefore, they also have soft-switching. Similarly, the soft-switching is performed for the negative cycle as well.

The negative currents must be able to discharge the output capacitances of the power semiconductors $S_1$ and $S_4$. Therefore, the peak value of the auxiliary inductor current must follow the following profile:

$$i_p = |i_g| + i_{ZVS} \quad (9)$$

where $i_p$ is the peak value of the auxiliary inductor currents, $i_{aux}$.

According to Eq. (9), the envelope of the auxiliary inductor currents is a sinosoidal envelope plus a DC value defined by $i_{ZVS}$. $i_{ZVS}$ must be large enough to discharge the output capacitances of the power semiconductors during the dead-time, $t_d$. Thus, $i_{ZVS}$ is derived as:

$$i_{ZVS} = C_{So} \frac{V_{dc}}{t_d} \quad (10)$$

where $C_{So}$ is the equivalent output capacitance of the power semiconductors $S_1$ and $S_2$ for the first leg and the power semiconductors $S_3$ and $S_4$ for the second leg. Similarly, $t_d$ is the dead-time between the gate pulses of the power semiconductors in the first leg and the gate pulses of the power semiconductors in the second leg.

In order to control the auxiliary inductor current whose peak follows the envelope defined by Eq. (9), the switching frequency of the inverter is used. The peak value of the auxiliary inductor current is calculated as:

$$i_p = \frac{(V_{dc} - |v_g|)d}{8 L_{aux} f_{sw}} \quad (11)$$

where d is the duty cycle of the full-bridge inverter output voltage, $v_{AB}$.

In the present invention, the switching frequency of the full-bridge inverter is controlled such that the current flowing through the auxiliary circuit is optimized (i.e., its peak follows the envelope defined by Eq. (9)). According to Equation (11), the optimal value of the switching frequency is given by:

$$f_{sw}^{Opt} = \frac{(V_{dc} - |v_g|)d}{8 L_{aux} \left( C_{So} \frac{V_{dc}}{t_d} + |i_g| \right)} \quad (12)$$

For greater clarity, in the above equations, the following variables are used to represent the following quantities:

$L_{M1}$ is a mutual inductance of the first auxiliary inductor and the first main inductor, $L_{M2}$ is a mutual inductance of the second auxiliary inductor and the second main inductor, $L_1$ is a self inductance of the first main inductor, $L_2$ is a self inductance of the second main inductor, $L_{aux1}$ is a self inductance of the first auxiliary inductor, $L_{aux2}$ is a self inductance of the second auxiliary inductor, $C_{So}$ is an equivalent output capacitance of the power semiconductors, $V_{dc}$ is an input voltage of the inverter, $v_g$ is the grid voltage, $t_d$ is a dead time between pulses of the power semiconductors in each leg, and d is the duty cycle of the full-bridge output voltage.

Figure 10:
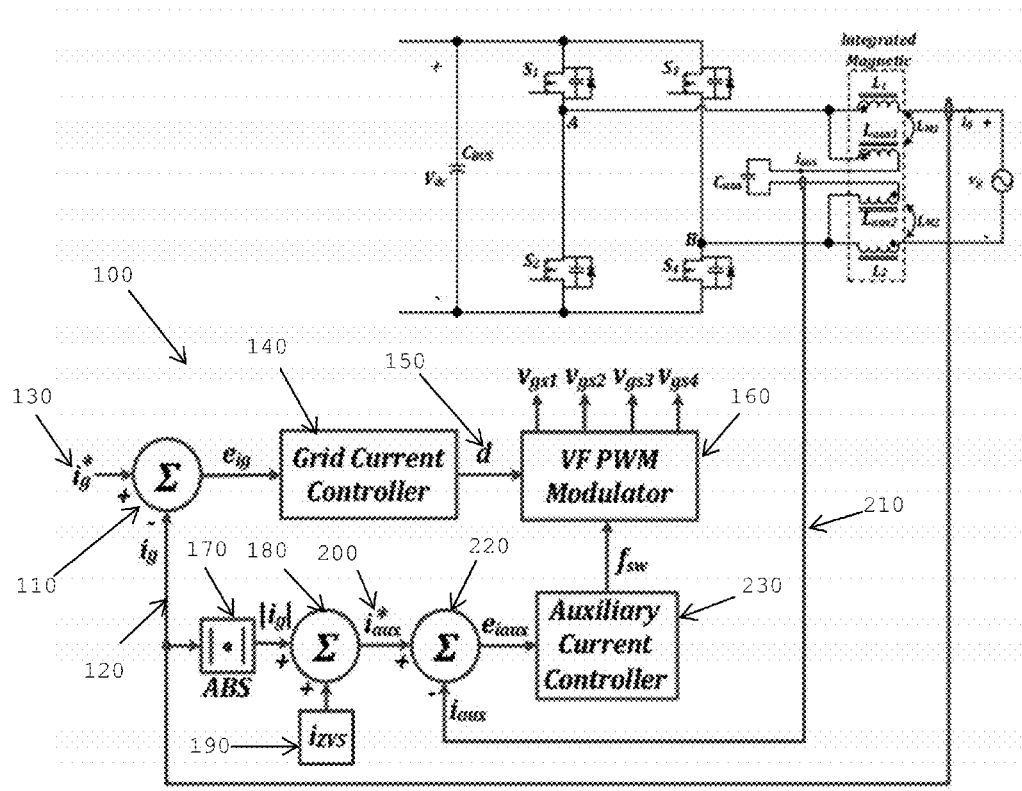
FIG. 10 is a diagram depicting the various components of a control system for the circuit in FIG. 4 and which provides both soft-switching and ripple attenuation capabilities for the circuit.

The topologies according to the various aspects of the present invention require a specific control system in order to control both the output current of the DC/AC inverter and the current flowing through the auxiliary circuit. FIG. 10 illustrates the block diagram of the control system for the DC/AC inverter according to one aspect of the invention.

According to FIG. 10, the duty cycle of the full-bridge output voltage is adjusted to control the output current of the DC/AC inverter and the switching frequency of the DC/AC inverter is adjusted to control the peak value of the auxiliary inductor current. Therefore, the control system includes two separate loops to control the output current and the auxiliary inductor current for soft-switching. The value of the duty cycle from the grid current controller and the value of the switching frequency from the auxiliary current controller are given to the Variable Frequency Pulse-Width Modulation (VF PWM Modulator). The VF PWM Modulator receives the switching frequency and the duty cycle and produces the gate pulses for the power semiconductors accordingly.

Referring to FIG. 10, the control system 100 includes a summation block 110 that subtracts the grid or load current 120 from a desired grid current 130. The grid current is tapped from the positive lead of the grid or load to the inverter as can be seen from the Figure. The output of the summation block 110 is an error value that is fed to a grid current controller block 140. The grid current controller block outputs a duty cycle d 150 that is sent to a variable frequency pulse-width modulation block 160. This modulation block 160 adjusts the timing of the gate signals for the power semiconductors on the converter.

The other control loop in FIG. 10 provides the switching frequency for the power semiconductors. In this loop, the grid current 120 is received by an absolute value block 170 that takes the absolute (or positive) value of the grid current. The output of block 170 is then sent to a summation block 180. The summation block 180 receives the output of zero voltage switching (ZVS) block 190 that gives the desired current for zero voltage switching. The block 180 then adds the grid current absolute value to the desired ZVS current to produce the desired auxiliary current 200. The actual auxiliary current 210 (tapped from the auxiliary connection between the auxiliary capacitor in the output filter) is subtracted from the desired auxiliary current 200 to result in an error signal. This error signal is then sent to an auxiliary current controller block 230. The controller block 230 then produces the desired switching frequency. This switching frequency is then sent to the VFPWM modulator block 160.

In order to evaluate the performance of the DC/AC inverter according to one aspect of the present invention, a computer simulation has been conducted. To compare the performance of the DC/AC inverter in the present invention with a conventional inverter, first the auxiliary path is disconnected. This auxiliary path is that path to the auxiliary capacitor $C_{aux}$ from the auxiliary inductors $L_{aux1}$ and $L_{aux2}$ and includes these components. It should be noted that when the auxiliary path is disconnected, the DC/AC inverter of the present invention operates as a conventional DC/AC inverter.

Figure 11:
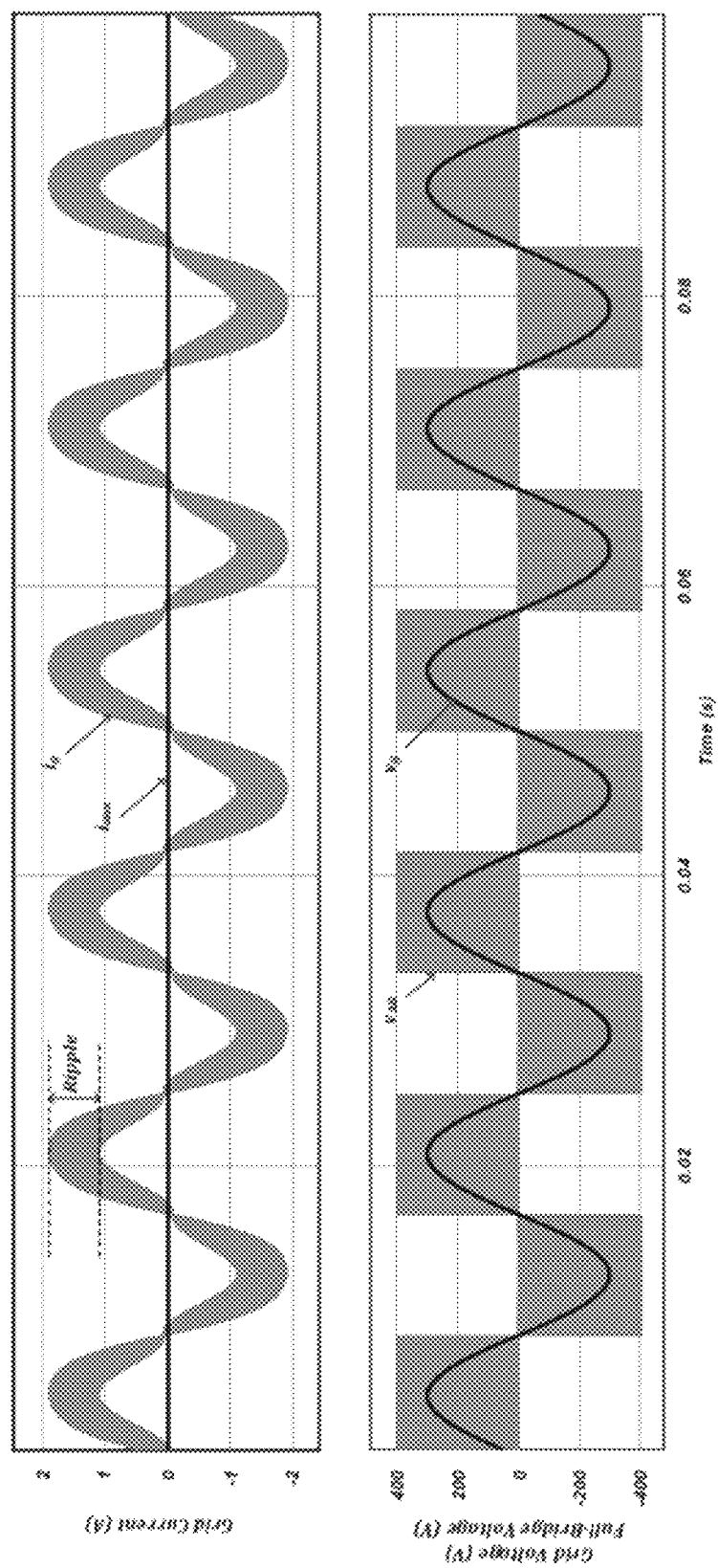
FIG. 11 illustrates waveforms for a computer simulated circuit as depicted in FIG. 4 with the auxiliary path disconnected.
Figure 12:
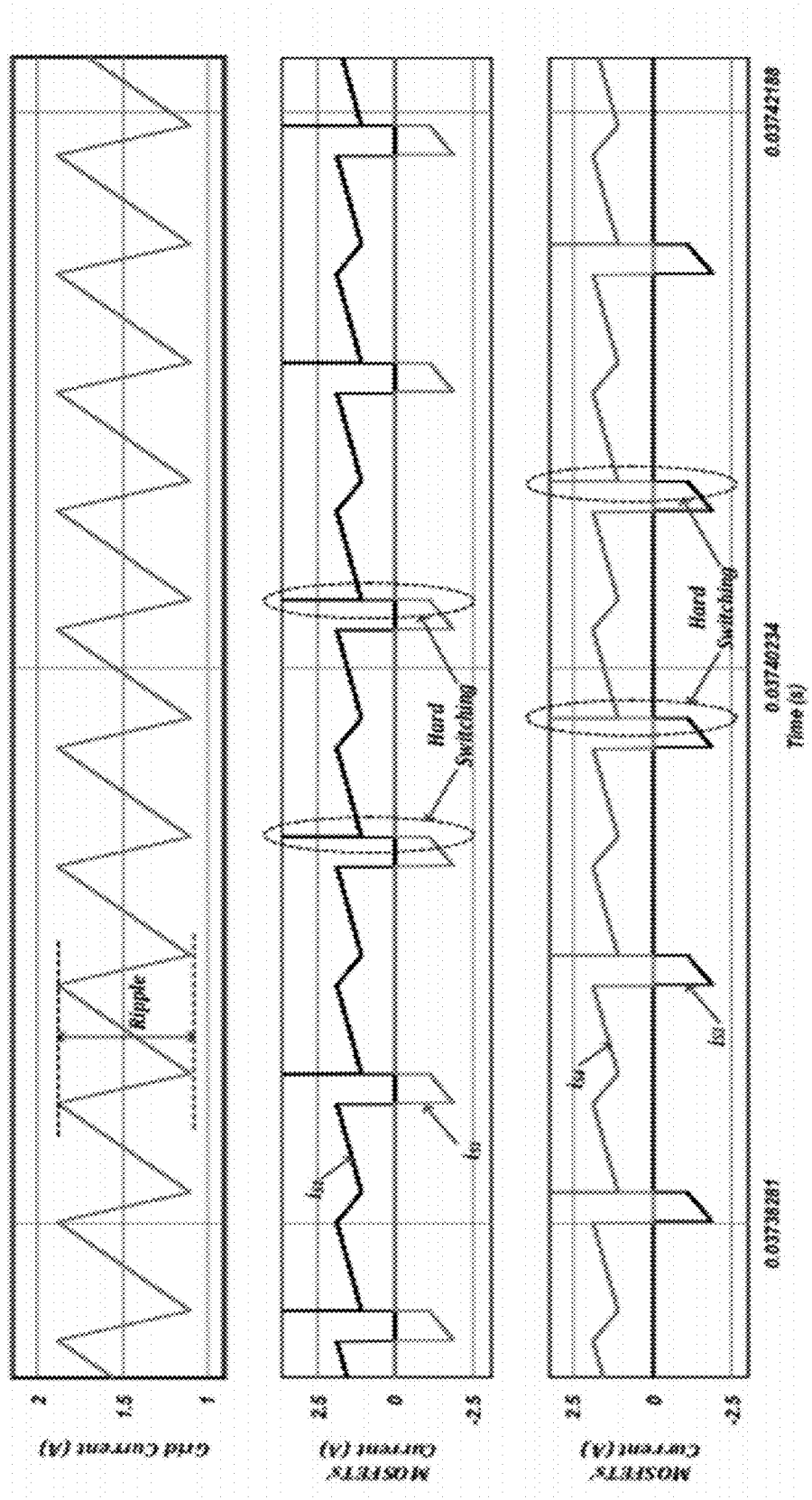
FIG. 12 shows switching waveforms for a computer simulated circuit as depicted in FIG. 4 with the auxiliary path disconnected.

FIG. 11 shows the waveforms of the DC/AC inverter when the auxiliary path is disconnected for a few line cycles. This figure illustrates a very high current ripple injected to the grid. FIG. 12 illustrates the waveforms of the DC/AC inverter when the auxiliary path is disconnected for a few switching cycles. FIG. 12 shows a very high grid current ripple. Also, FIG. 12 shows that the power semiconductors $S_1$ and $S_4$ are hard switched during the positive line cycle (power semiconductors $S_2$ and $S_3$ are hard switched during the negative line cycle). Therefore, there is a high amount of switching losses related to the power semiconductors. FIG. 11 and FIG. 12 show the poor performance of the conventional DC/AC inverter in terms of the grid current ripple and switching performance.

Figure 13:
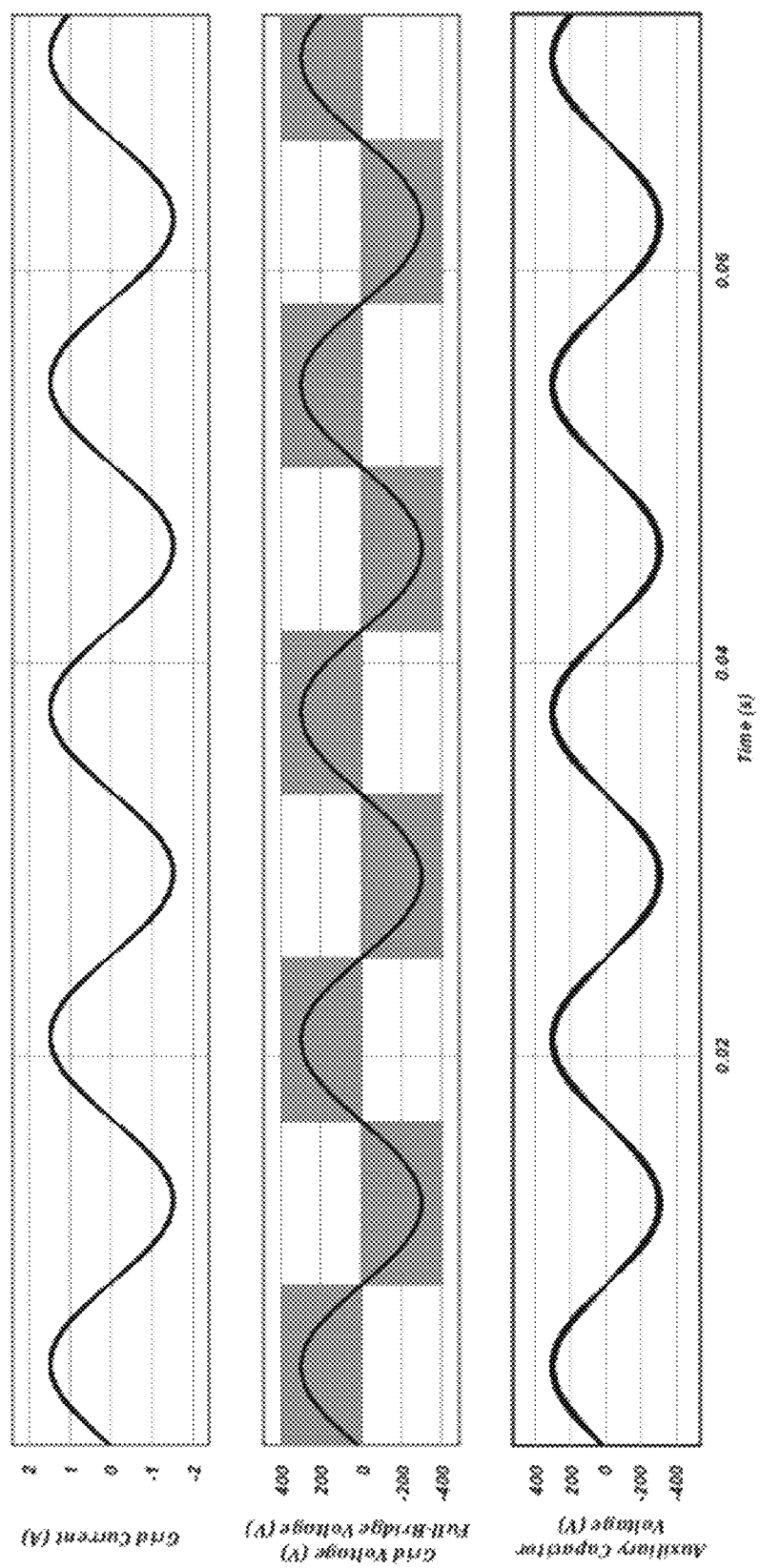
FIG. 13 shows waveforms for a few line cycles for a computer simulated circuit as depicted in FIG. 4 with the auxiliary path connected.

FIG. 13 shows the waveforms of the DC/AC inverter according to one aspect of the invention and as shown in FIG. 4 for a few line cycles. This figure shows nearly zero ripple in the grid current. Also, the voltage across the auxiliary capacitor is illustrated in FIG. 13. FIG. 13 shows that the auxiliary capacitor voltage follows the grid voltage waveform.

Figure 14:
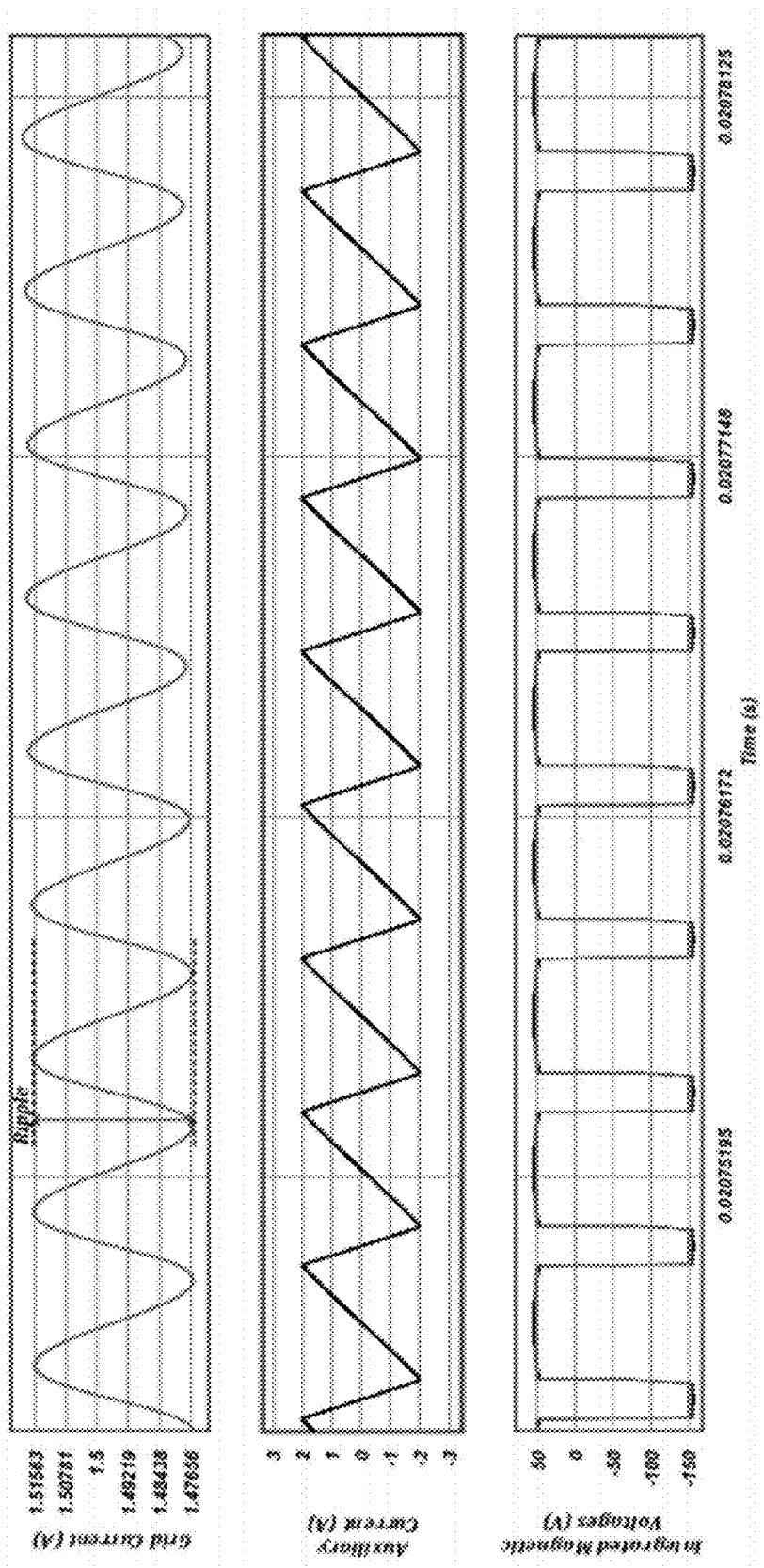
FIG. 14 illustrates current ripple and auxiliary waveforms for a computer simulated the circuit as depicted in FIG. 4.

FIG. 14 shows the waveforms of DC/AC inverter according to one aspect of the invention and as shown in FIG. 4 for a few switching cycles. FIG. 14 shows a very small ripple of the grid current. FIG. 14 also shows the current flowing through the auxiliary inductors. This current provides the soft-switching condition for the power semiconductors. As well, it can be seen from the figure that the ripple is steered from the main inductor to the auxiliary inductor and that the ripple is used to provide the soft-switching condition.

Figure 15:
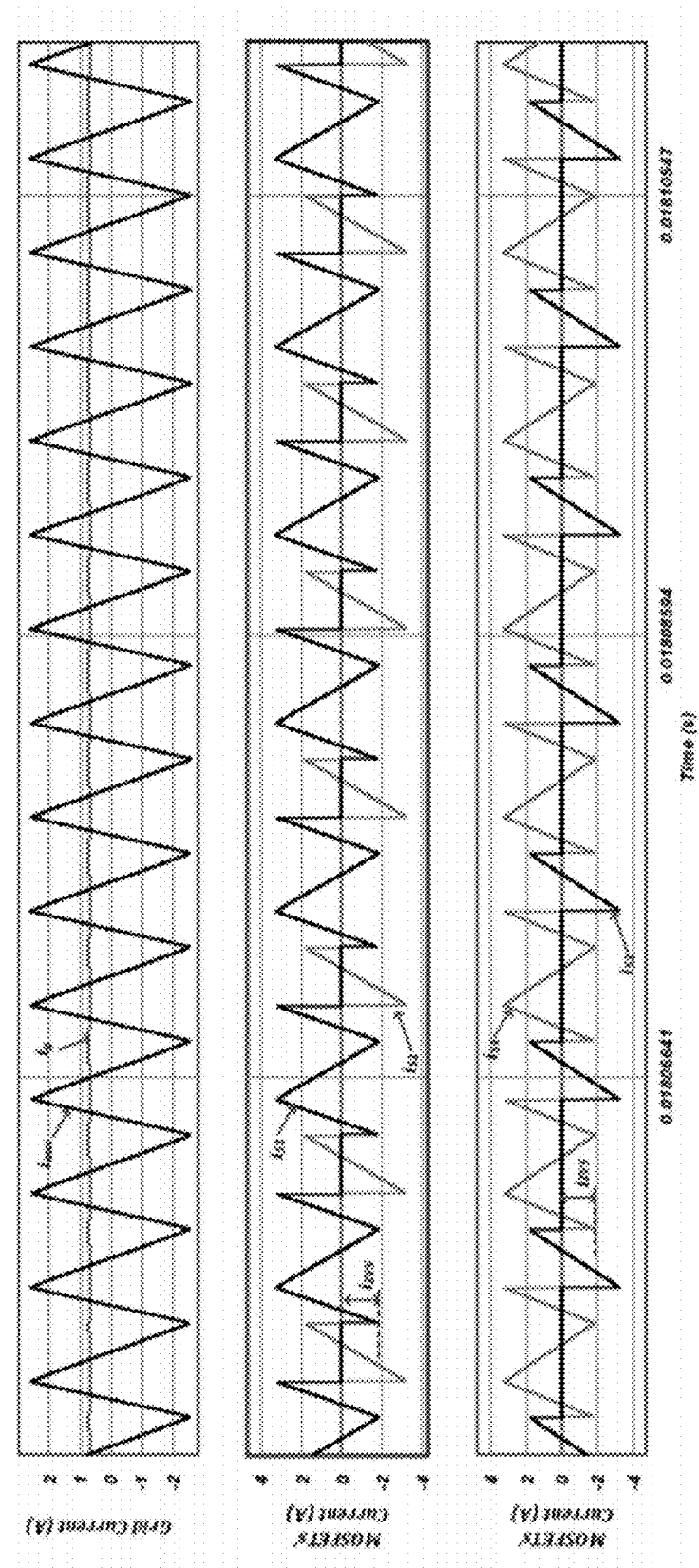
FIG. 15 shows soft-switching waveforms for a computer simulated circuit as shown in FIG. 4.

FIG. 15 shows the soft-switching of the power semiconductors in the DC/AC inverter of the present invention. FIG. 15 shows that the auxiliary current provides a negative current prior to the semiconductor turn-on time, leading to the turning on of the semiconductor under zero voltage.

Figure 16:
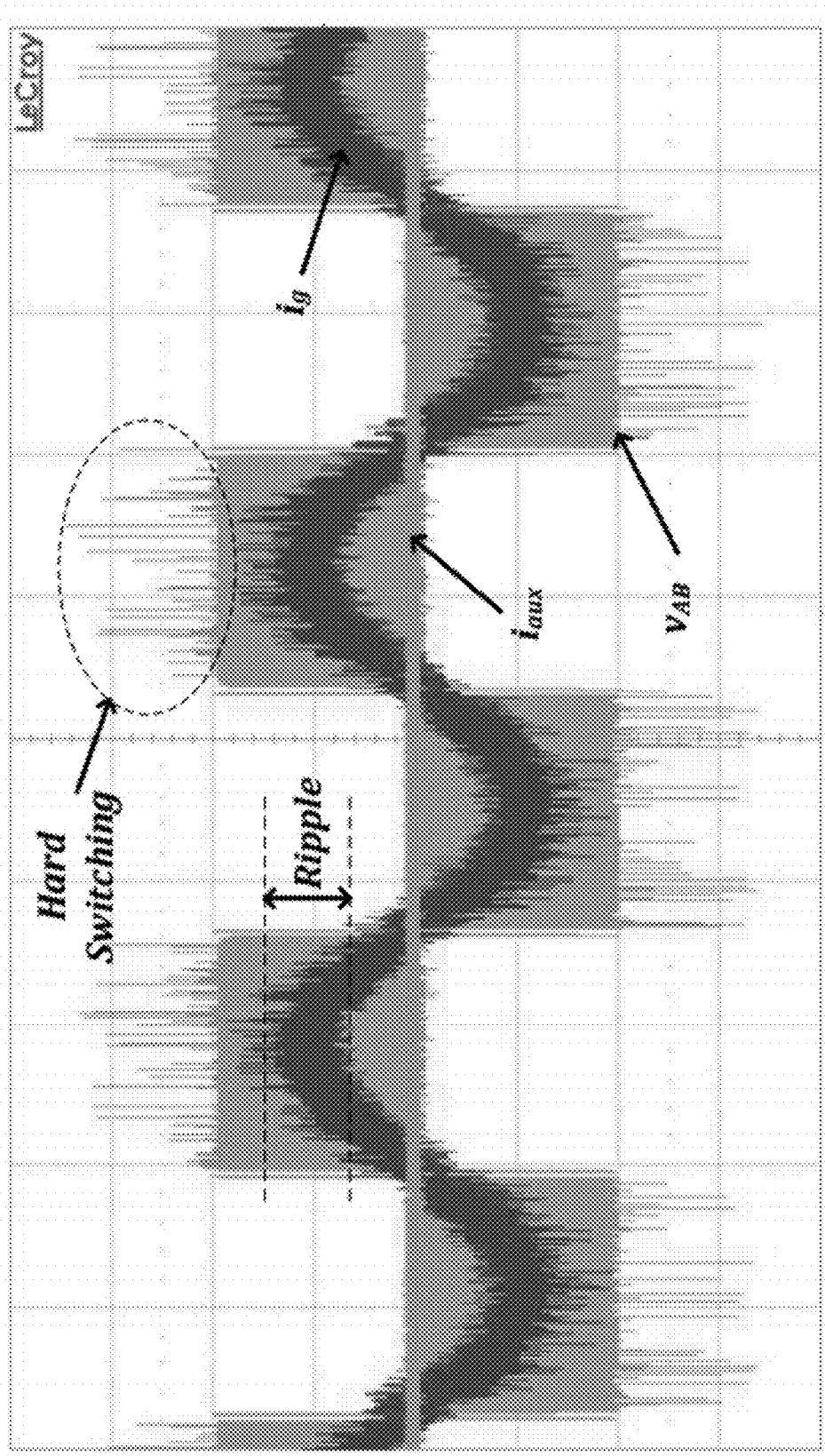
FIG. 16 shows waveforms for a prototype of the circuit in FIG. 4 with the auxiliary path disconnected.
Figure 17:
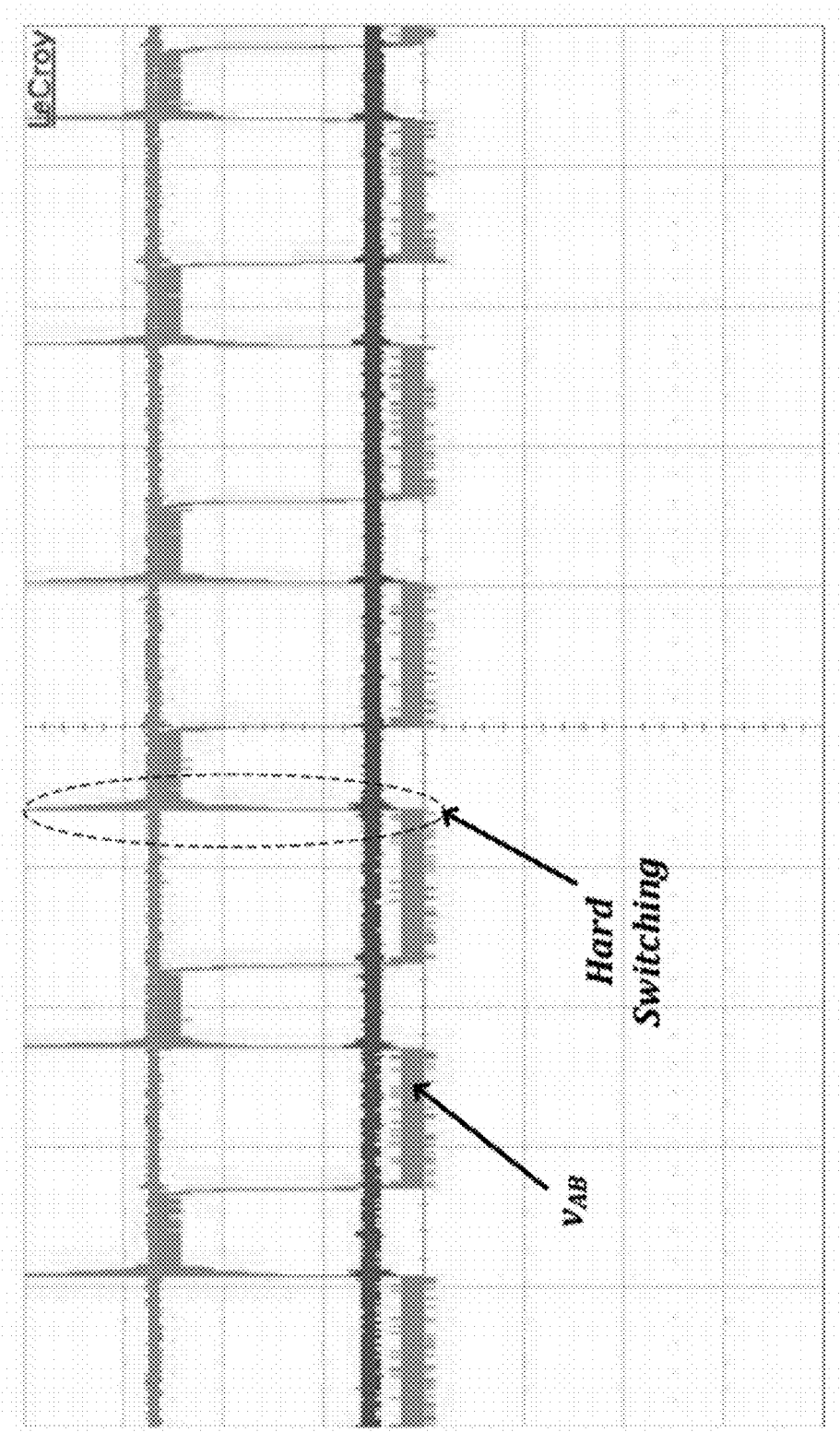
FIG. 17 shows hard-switching of the power semiconductors for a prototype of the circuit in FIG. 4 with the auxiliary path disconnected.

In terms of implementation, an experimental prototype of the DC/AC inverter according to one aspect of the invention was prepared to practically evaluate its performance. In order to experimentally compare the performance of the DC/AC inverter of the invention with a conventional DC/AC inverter, first the auxiliary path was disconnected. FIG. 16 shows the experimental results of the DC/AC inverter when the auxiliary path is disconnected. This figure shows a very high current ripple injected to the grid. FIG. 16 also shows very high voltage spikes caused by hard-switching in the conventional DC/AC inverter. FIG. 17 shows the experimental results of the DC/AC inverter for a few switching cycles when the auxiliary path is disconnected. This figure shows very high voltage spikes due to the hard-switching of the power semiconductors.

Figure 18:
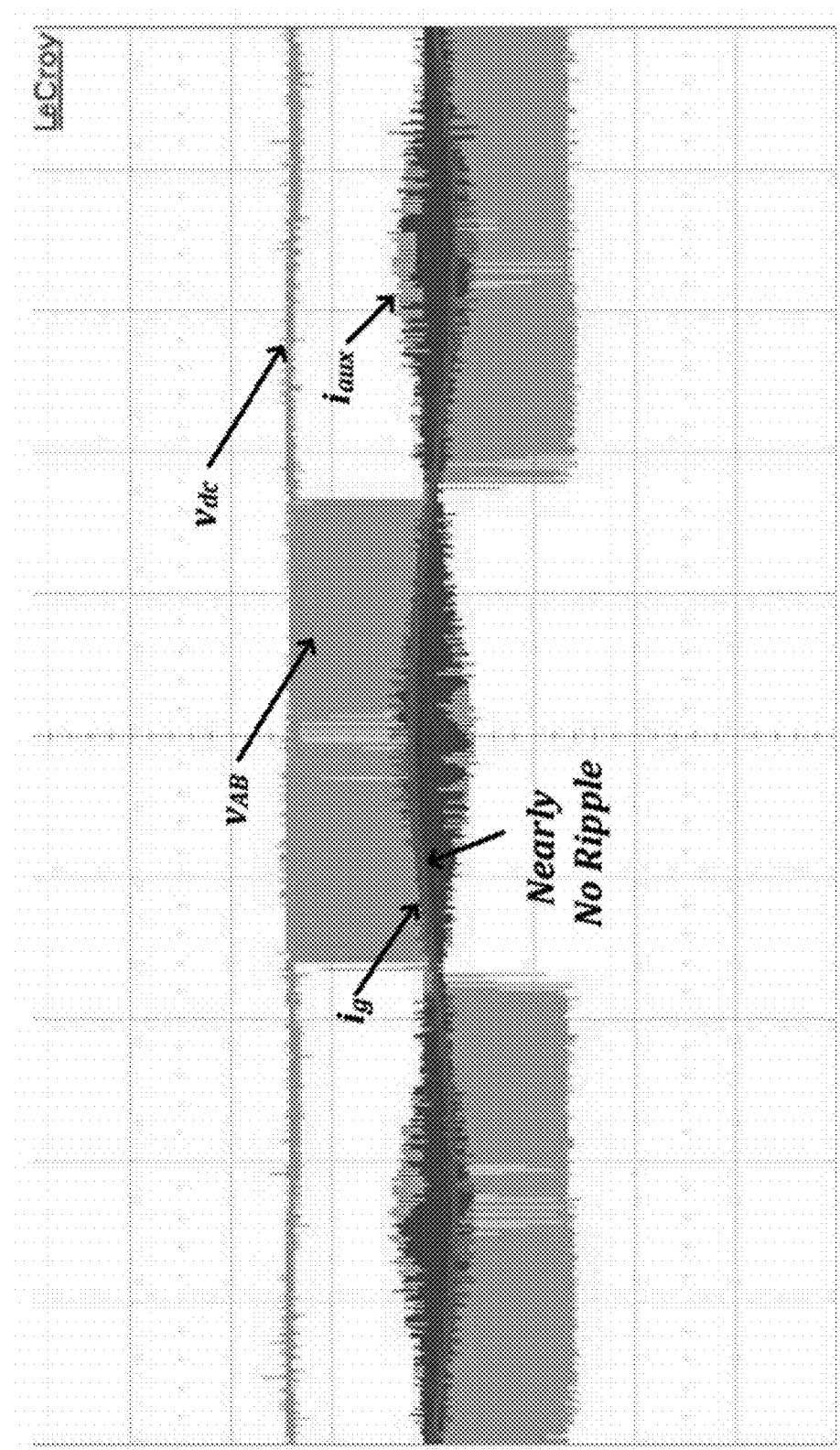
FIG. 18 shows waveforms for a prototype of the circuit in FIG. 4 with the auxiliary path connected.

FIG. 18 shows the experimental waveforms of the DC/AC inverter according to one aspect of the invention. This figure shows the full-bridge output voltage, the grid current and the auxiliary inductor current. It can be seen from this figure that the grid current has a very low ripple. Also, it can be seen that there are no voltage spikes due to the soft-switching of the power semiconductors.

Figure 19:
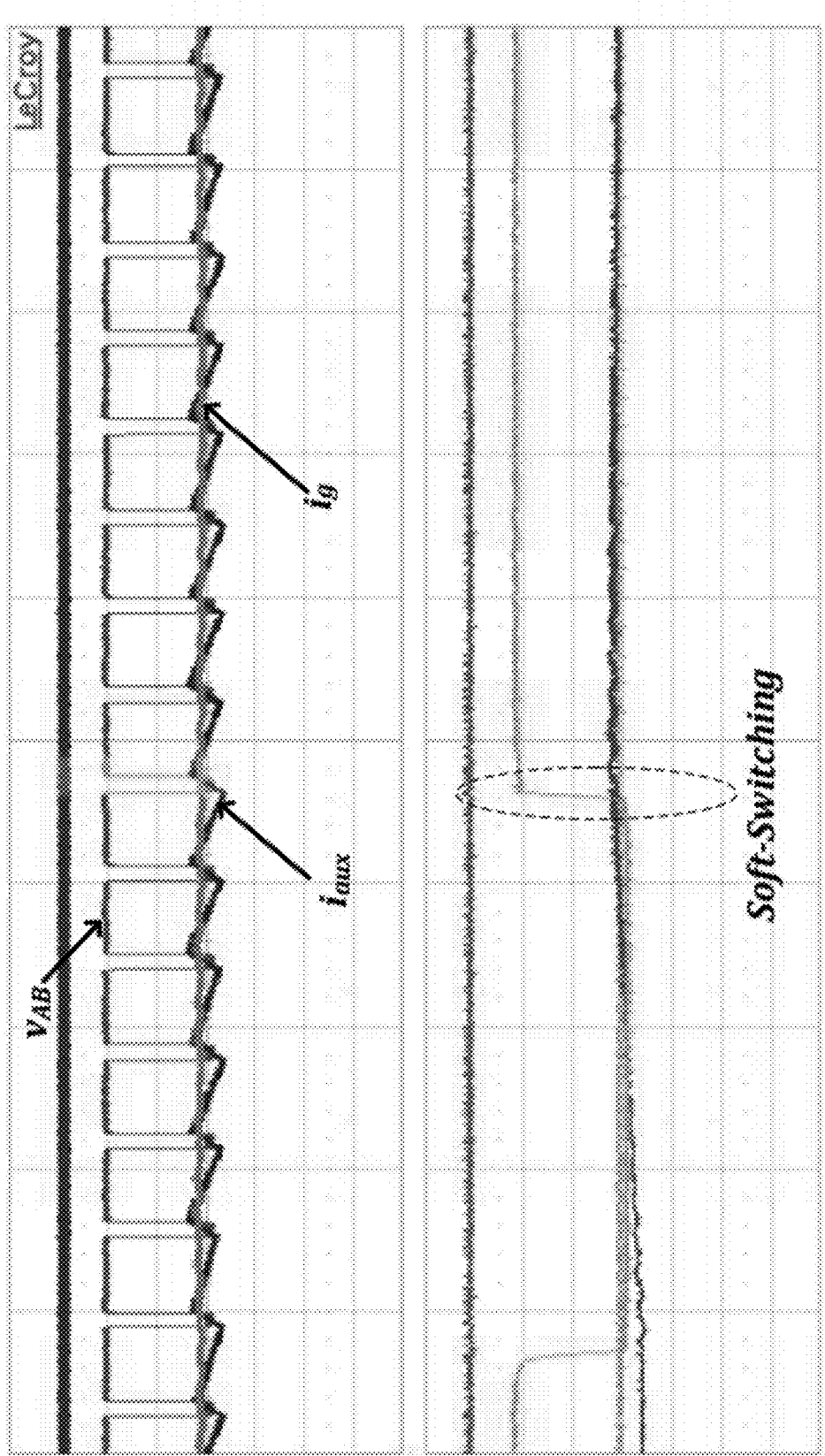
FIG. 19 shows waveforms for a few switching cycles for a prototype of the circuit in FIG. 4 with the auxiliary path connected and which show soft-switching and ripple attenuation.
Figure 20:
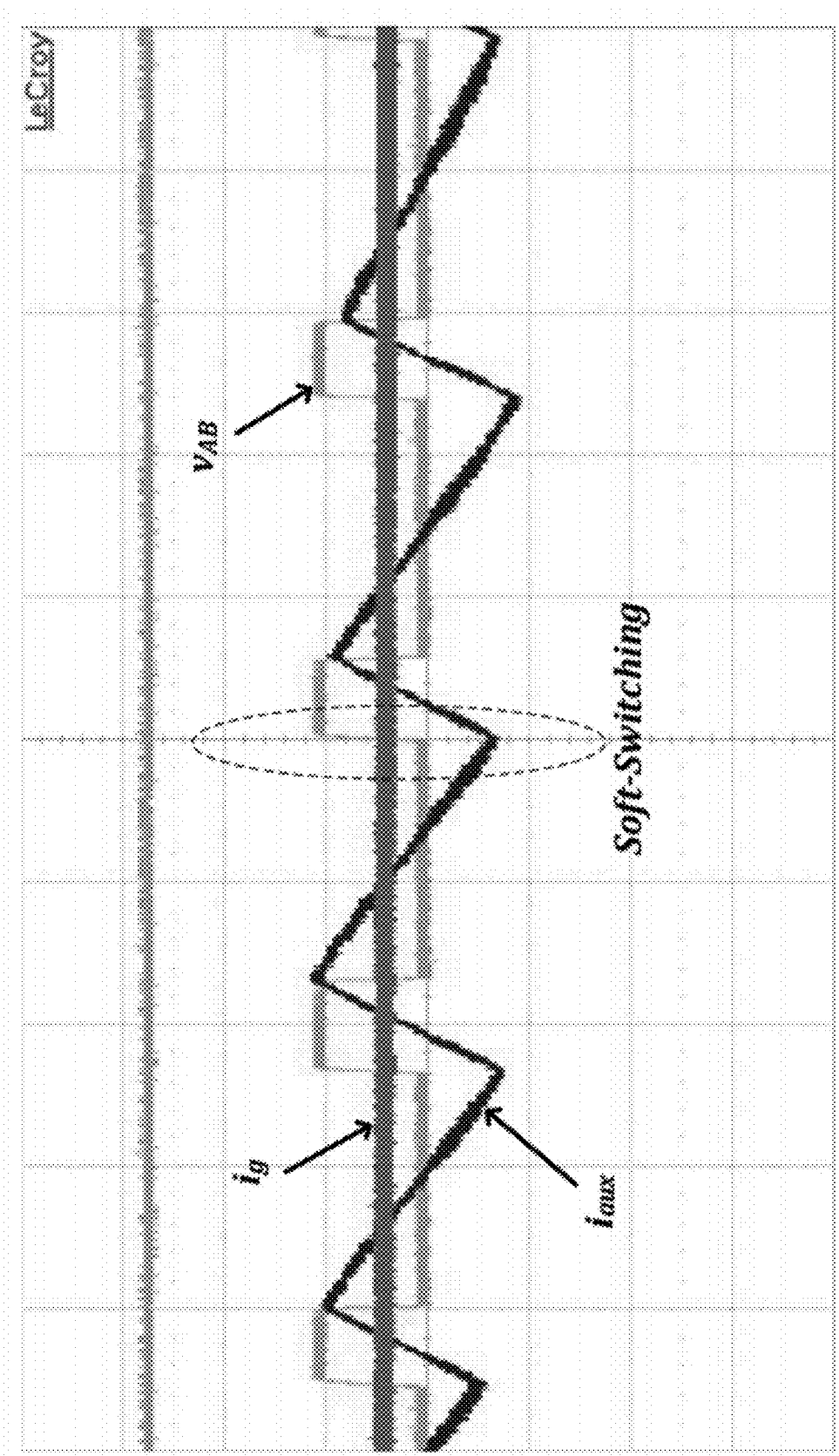
FIG. 20 illustrates soft-switching waveforms for the inverter circuit in FIG. 4 due to the auxiliary inductors.

FIG. 19 shows the experimental waveforms of the prototype DC/AC inverter for a few switching cycles. This figure shows the soft-switching of the power semiconductors and very low ripple of the grid current. FIG. 20 shows the experimental waveforms of the full-bridge inverter. This figure shows that the voltage rises very smoothly and that there are no voltage spikes at the output of the full-bridge.

In another aspect of the invention, the system controller may be replaced or be used in conjunction with computer controlled hardware with suitable control software. As an example, the system controller may be replaced or used in conjunction with an application specific integrated circuit (ASIC) which has been suitably programmed to execute at least some of the functions of the controller.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A DC/AC inverter comprising:
   a DC-bus capacitor;
   a full bridge converter having a first and a second leg coupled in parallel, each leg comprising at least two power semiconductors, said DC-bus capacitor being coupled in parallel to said converter;
   an output filter having an integrated magnetic subcircuit for steering a current ripple at an output of said inverter to said power semiconductors in said converter, said output filter being coupled to said converter and to a load;
   wherein
   said filter attenuates said current ripple at said output when said current ripple is steered to said converter;
   said integrated magnetic subcircuit comprises:
      a first main inductor;
      a second main inductor;
      a first auxiliary inductor;
      a second auxiliary inductor;
      an auxiliary capacitor;
   each inductor has a self-inductance and a mutual inductance with at least a corresponding inductor; and
   said first main inductor and said first auxiliary inductor are wound around a common core;
   wherein said inverter is controlled by a controller, the controller comprising:
      a grid current controller for calculating a desired duty ratio for said inverter;
         wherein said grid current controller calculates said desired duty ratio from an actual grid current, said actual grid current received from a positive lead of a grid;
      an auxiliary current controller for calculating a desired switching frequency;
         wherein said auxiliary current controller calculates said desired switching frequency from an actual auxiliary current, said actual auxiliary current being received from an auxiliary connection, said auxiliary connection being between the two terminals of said auxiliary capacitor;
      a modulator for adjusting a duty ratio for said inverter based on said desired duty ratio and for adjusting a switching frequency of said power semiconductors based on said desired switching frequency;
   wherein said modulator controls gate signals for said power semiconductors.

2. An inverter according to claim 1 wherein each of said main inductors is coupled between one leg of said converter and an output lead of said inverter.

3. An inverter according to claim 1 wherein each of said auxiliary inductors is coupled between said auxiliary capacitor and one leg of said converter.

4. An inverter according to claim 2 wherein said first main inductor is coupled to a first coupling point on said first leg of said converter, said first coupling point being located between two power semiconductors coupled in series on said first leg.

5. An inverter according to claim 2 wherein said second main inductor is coupled to a second coupling point on said second leg of said converter, said second coupling point being located between two power semiconductors coupled in series on said second leg.

6. An inverter according to claim 4 wherein said first main inductor is coupled between said first leg of said converter and a positive lead of said load.

7. An inverter according to claim 5 wherein said first main inductor is coupled between said second leg of said converter and a negative lead of said load.

8. An inverter according to claim 1 wherein said load is a power grid.

9. An inverter according to claim 1 wherein said first main inductor has a mutual inductance with said first auxiliary inductor and wherein said second main inductor has a mutual inductance with said second auxiliary inductor.

10. An inverter according to claim 1 wherein said second main inductor and said second auxiliary inductor are wound around a common core.

11. An inverter according to claim 1 wherein each power semiconductor has an associated capacitor and diode as a subcircuit.

12. An inverter according to claim 11 wherein said output filter steers said ripple current to capacitors of said power semiconductors.

13. An output filter comprising:
   a first main inductor;
   a second main inductor;
   a first auxiliary inductor;
   a second auxiliary inductor;
   an auxiliary capacitor;
   wherein
   said first main inductor is coupled between a first input connection point and a positive lead of a load;
   said second main inductor is coupled between a second input connection point and a negative lead of a load;
   said first auxiliary inductor is coupled between said auxiliary capacitor and said first input connection point;
   said second auxiliary inductor is coupled between said auxiliary capacitor and said second input connection point;
   said first main inductor and said first auxiliary inductor have a mutual inductance;
   said second main inductor and said second auxiliary inductor have a mutual inductance;
   said first main inductor and said first auxiliary inductor are wound around a common core; and
   wherein a current flowing through said auxiliary capacitor is controlled by an inverter circuit controller, said inverter circuit controller calculating said current flow from an actual auxiliary current received from an auxiliary connection, said auxiliary connection being between the two terminals of said auxiliary capacitor.

14. An output filter according to claim 13 wherein said output filter is used in an inverter circuit to steer a ripple current of an output current of said inverter circuit to a converter in said inverter circuit.

15. An output filter according to claim 13 wherein said load is a connection to a power grid.

16. An output filter according to claim 14 wherein steering said ripple current also provides zero voltage switching to power semiconductors in said converter.

17. An inverter according to claim 14 wherein said first input connection point is located on a first leg of a full bridge converter on said inverter and said second input connection point is located on a second leg of said full bridge converter.

* * * * *